US010724941B2

(12) United States Patent
Watanabe et al.

(10) Patent No.: US 10,724,941 B2
(45) Date of Patent: Jul. 28, 2020

(54) LIQUID MEMBRANE FORMING DEVICE AND LIQUID MEMBRANE CARTRIDGE USED THEREIN

(71) Applicant: FEMTO Deployments Inc., Okayama-shi, Okayama (JP)

(72) Inventors: Akira Watanabe, Okayama (JP); Bunpei Doi, Okayama (JP)

(73) Assignee: FEMTO Deployments, Inc., Okayama-shi, Okayama (JP)

( * ) Notice: Subject to any disclaimer, the term of this patent is extended or adjusted under 35 U.S.C. 154(b) by 0 days.

(21) Appl. No.: 16/073,159

(22) PCT Filed: Feb. 7, 2017

(86) PCT No.: PCT/JP2017/004404
§ 371 (c)(1),
(2) Date: Jul. 26, 2018

(87) PCT Pub. No.: WO2017/138525
PCT Pub. Date: Aug. 17, 2017

(65) Prior Publication Data
US 2019/0041315 A1      Feb. 7, 2019

(30) Foreign Application Priority Data

Feb. 12, 2016   (JP) ................................ 2016-024561
Jun. 13, 2016   (JP) ................................ 2016-117452

(51) Int. Cl.
*G01N 21/01*           (2006.01)
*G01N 21/3577*     (2014.01)
(Continued)

(52) U.S. Cl.
CPC ............. *G01N 21/01* (2013.01); *B01D 69/00* (2013.01); *B05B 1/262* (2013.01); *G01N 1/28* (2013.01);
(Continued)

(58) Field of Classification Search
None
See application file for complete search history.

(56) References Cited

U.S. PATENT DOCUMENTS

| 4,441,188 A | 4/1984 | Stone |
| 5,849,064 A | 12/1998 | Marco et al. |

(Continued)

FOREIGN PATENT DOCUMENTS

| JP | 61-040664 U | 3/1986 |
| JP | 61-056561 U | 4/1986 |

(Continued)

OTHER PUBLICATIONS https://web.archive.org/web/20150415035101/https://www.diynetwork.com/how-to/outdoors/structures/outdoor-water-features-pictures (Year: 2015).*

(Continued)

*Primary Examiner* — James Choi
(74) *Attorney, Agent, or Firm* — Polsinelli PC (57) ABSTRACT

A liquid membrane 100 is formed by jetting a liquid sucked from a recovery reservoir 11a and pressurized using a pump 12 from a nozzle of a liquid membrane cartridge 20. The formed liquid membrane 100 makes contact with a slope wall of the liquid membrane cartridge 20 along a surface of the liquid membrane 100. The liquid running down from the slope wall is recovered and stored in the recovery reservoir 11a in order to recover the liquid running down along the slope wall in a decelerated state into the recovery reservoir 11a. As a result, it is possible to prevent air bubbles from being generated by agitation of a liquid of the recovery reservoir 11a when the liquid enters the recovery reservoir 11a.

16 Claims, 8 Drawing Sheets

(51) Int. Cl.
  *G01N 21/3586* (2014.01)
  *G01N 1/28* (2006.01)
  *G01N 21/05* (2006.01)
  *B01D 69/00* (2006.01)
  *B05B 1/26* (2006.01)

(52) U.S. Cl.
  CPC ......... *G01N 21/05* (2013.01); *G01N 21/3577* (2013.01); *G01N 21/3586* (2013.01); *G01N 1/2813* (2013.01)

(56) References Cited

U.S. PATENT DOCUMENTS

2007/0267575 A1* 11/2007 Holly ................ G01N 21/0332
  250/343
2015/0072405 A1  3/2015 Ito

FOREIGN PATENT DOCUMENTS

| JP | 2005-213880 A | 8/2005 |
|---|---|---|
| JP | 2008-051721 A | 3/2008 |
| JP | 2008-241567 A | 10/2008 |
| JP | 2011-214842 A | 3/2010 |
| JP | 2011-127950 A | 6/2011 |
| JP | 2015-219088 A | 12/2015 |
| WO | WO-2013/108293 A1 | 1/2012 |
| WO | 2013/091118 A1 | 6/2013 |

OTHER PUBLICATIONS https://web.archive.org/web/20130509235301/http://homeguides.sfgate.com/make-circulating-fountain-42543.html (Year: 2015).*
https://web.archive.org/web/20150627083609/http://www.jandy.com/en/products/water-features/fiberfall (Year: 2015).*
Ohba et al. "Effect of liquid-sheet thickness on detection sensitivity for laser-induced breakdown spectroscopy of aqueous solution" Opt Express. Oct. 6, 2014;22(20):24478-90 (Year: 2014).*
Kondoh et al., "Liquid-sheet jets for terahertz spectroscopy" vol. 22, Issue 12, pp. 14135-14147 (2014) (Year: 2014).*
Picchiotti et al., "A closed-loop pump-driven wire-guided flow jet for ultrafast spectroscopy of liquid samples", Review of Scientific Instruments 86, pp. 093105-1-093105-6, (2015).
European Search Report dated Aug. 28, 2019 issued in corresponding European Application No. 17750247.3 (9 pages).

* cited by examiner

LIQUID MEMBRANE FORMING DEVICE AND LIQUID MEMBRANE CARTRIDGE USED THEREIN

CROSS REFERENCE TO RELATED APPLICATIONS

This application is a National Phase filing under 35 U.S.C. § 371 of PCT/JP2017/004404 filed on Feb. 7, 2017; and this application claims priority to Application No. 2016-024561 filed in Japan on Feb. 12, 2016 and Application No. 2016-117452 filed in Japan on Jun. 13, 2016 under 35 U.S.C. § 119. The entire contents of each application are hereby incorporated by reference.

TECHNICAL FIELD

The present invention relates to a liquid membrane forming device and a liquid membrane cartridge used therein, and more particularly, to a device for forming a liquid membrane as a liquid sample in a system for measuring physical or chemical properties of the sample on the basis of a change of the electromagnetic wave caused by interaction between the electromagnetic wave and the sample during transmission through the sample by arranging the liquid sample in the middle of an electromagnetic wave propagation passage.

BACKGROUND ART

In the related art, a spectroscopic device for measuring characteristics of materials using electromagnetic waves such as ultraviolet rays, infrared rays, microwaves, and terahertz waves is known. Spectroscopy is classified into absorption spectroscopy or emission spectroscopy depending on a physical amount measured by electromagnetic waves. In the absorption spectroscopy, electromagnetic waves transmit through a sample as a spectroscopic measurement target, so that physical or chemical properties of the sample are measured on the basis of a change of the electromagnetic wave caused by interaction between the electromagnetic wave and the sample during transmission through the sample. Meanwhile, in the emission spectroscopy, electromagnetic waves are emitted from the sample in any method, and the intensity of the emitted electromagnetic wave is measured.

A measurement target substance used as a sample of the spectroscopic measurement encompasses various types such as a gaseous type, a solid type, and a liquid type. A method of installing the measurement target substance has been studied in order to allow electromagnetic waves to appropriately transmit depending on each type. For example, in order to perform high precision measurement for the liquid type sample, it is necessary to form the sample arranged on the spectroscopic device to be thin enough to transmit electromagnetic waves. In particular, when the liquid sample is subjected to the spectroscopic measurement based on terahertz waves, an absorption effect of the terahertz wave caused by water molecules is strong. Therefore, in order to prevent degradation of an S/N ratio of the measurement signal, it is necessary to shape the liquid in a plate-shaped uniform thickness membrane and allow terahertz waves to transmit through the plate-shaped portion to perform measurement.

In general, in the measurement of the liquid sample, a sample is nipped into a container (usually called a "liquid cell") formed of a material capable of transmitting electromagnetic waves, such as glass, and electromagnetic waves are incident to the liquid cell from the outside, so that the electromagnetic wave transmitting through the liquid cell is measured. However, when the measurement is performed by nipping the liquid sample into the liquid cell, spectrometric information on a cell material is mixed as noise with the spectrometric information on the liquid sample, and this hinders measurement of genuine spectrometric information.

In the related art, in view of such problems, a device capable of measuring spectrometric information with little noise without using the liquid cell has been proposed (for example, refer to Patent Documents 1 and 2). In the devices discussed in Patent Documents 1 and 2, a thin plate-shaped liquid membrane is formed by jetting the liquid sample from a nozzle having a special structure by a pump pressure.

However, if the liquid is pressurized by the pump and is jetted from the nozzle, the liquid may be dispersed from a nozzle opening. This dispersed liquid may pollute an optical system disposed near the nozzle disadvantageously. Note that it is necessary not to place any material other than the measurement target liquid in a portion where electromagnetic waves transmit through a liquid membrane formed by the nozzle. For this reason, it is difficult to enclose the vicinity of the nozzle in a closed space and provide a wall for perfectly blocking the dispersed liquid.

It is conceived that the liquid dispersion in the nozzle opening is generated by air bubbles contained in the jetted liquid. That is, in a case where the measurement target liquid jetted from the nozzle is stored in a recovery reservoir and is circulated using a pump in use, the liquid pressurized and jetted from the nozzle rebounds from a surface of the stored liquid and generates dispersion when it enters the recovery reservoir. In this case, the liquid stored in the recovery reservoir generates air bubbles due to agitation. In addition, the liquid containing the air bubbles is sucked using a pump and is pressurized again. Then, the liquid is sent to the nozzle. The air bubbles contained in this liquid cause bumping in the nozzle orifice and thus generate dispersion of the liquid.

A technique of preventing dispersion of water discharged from a water jet nozzle has been proposed (for example, see Patent Document 3). In the technique of Patent Document 3, a flow path expansion portion is formed in an upper surface side of a water channel directed from a water supply source to the water jet nozzle, and the air contained in the air bubble mixture water is selectively delivered to the upper wall surface of the flow path expansion portion and then collides with a step formed in a flow path narrowing portion directed from the expansion portion to a normal portion so that the air bubbles are fragmented or eliminated. As a result, it is possible to prevent dispersion of water discharged from the water jet nozzle.

Patent Document 1: JP-A-2011-127950
Patent Document 2: JP-A-2015-219088
Patent Document 3: JP-A-2005-213880

SUMMARY OF THE INVENTION

In the technique of Patent Document 3, it is possible to fragment or eliminate the air bubbles that may generate liquid dispersion. However, the flow path expansion portion formed in the middle of the water channel directed from the water supply source to the water jet nozzle changes a water flow before the discharge. For this reason, in a case where the technique of Patent Document 3 is applied to the spectroscopic device, it is difficult to form a liquid membrane thin and flat enough to allow electromagnetic waves to transmit.

In view of the aforementioned problems, an object of the invention is to enable formation of a liquid membrane thin and flat enough to allow electromagnetic waves to appropriately transmit, and prevention of liquid dispersion generated by air bubbles in a nozzle tip.

In order to address the aforementioned problems, according to an aspect of the invention, a liquid membrane is formed by jetting a liquid sucked from a recovery reservoir and pressurized using a pump from a nozzle. The formed liquid membrane makes contact with a slope wall along a surface of the liquid membrane. The liquid running down from the slope wall is recovered and stored in the recovery reservoir.

According to the invention having the aforementioned configuration, the liquid membrane formed by strongly jetting the liquid pressurized by the pump from the nozzle makes contact with the slope wall and is decelerated. In addition, the liquid running down along the slope wall in the decelerated state is recovered in the recovery reservoir. For this reason, it is possible to prevent air bubbles from being generated by agitation of a liquid in the recovery reservoir when the liquid enters the recovery reservoir. As a result, it is possible to prevent air bubbles from being incorporated into the jetted liquid when the liquid of the recovery reservoir is sucked and pressurized again using the pump and is jetted from the nozzle. Therefore, it is possible to prevent dispersion of the liquid caused by air bubbles in the nozzle tip.

According to the invention, the liquid membrane formed by jetting the liquid from the nozzle is decelerated by making contact with the slope wall after the jetting. Therefore, it is not necessary to provide an unnecessary uneven structure in the flow path of the liquid before being jetted from the nozzle (before forming the liquid membrane). According to the invention, the flow velocity of the liquid is decelerated not by lowering the pressure of the pump. Instead, the flow velocity is decelerated by bring the jetted liquid into contact with the slope wall while the liquid is strongly jetted from the nozzle by applying a pressure necessary to forma thin and flat liquid membrane. Therefore, it is possible to form a liquid membrane where electromagnetic waves suitably transmit using the nozzle.

As described above, according to the invention, it is possible to form a thin and flat liquid membrane enough to suitably transmit electromagnetic waves. In addition, it is possible to prevent dispersion of the liquid caused by air bubbles from being generated in the nozzle tip.

MODE FOR CARRYING OUT THE INVENTION

First Embodiment

Figure 1:
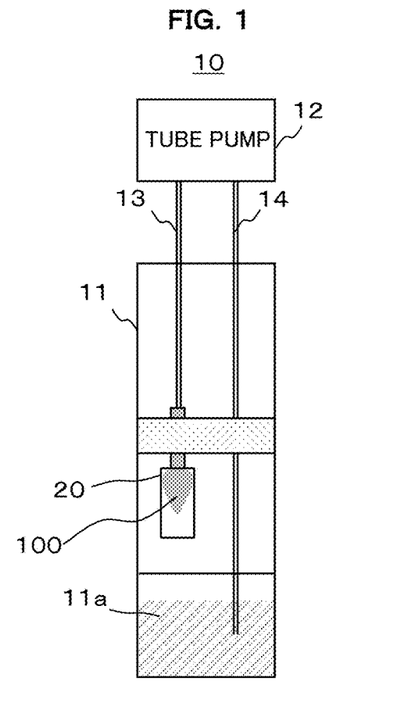
FIG. 1 is a diagram illustrating an exemplary configuration of a liquid membrane forming device according to a first embodiment.
Figure 2:
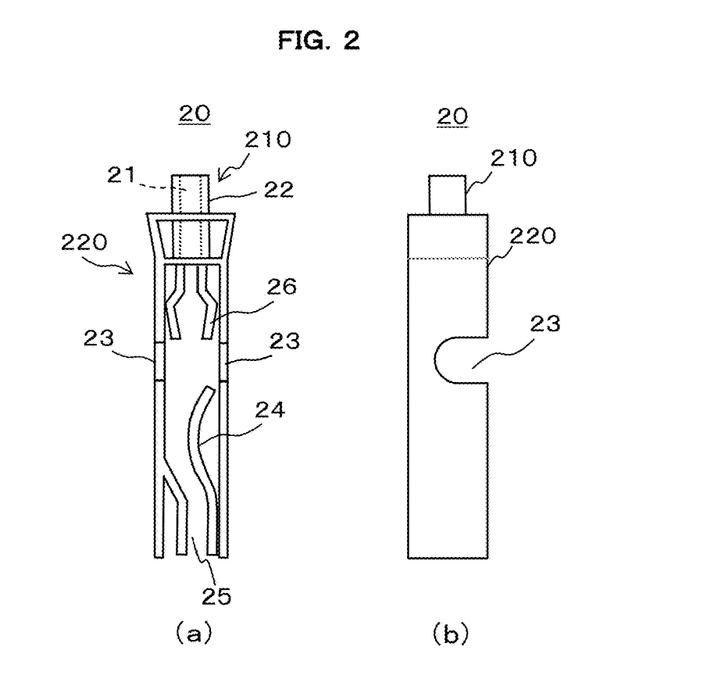
FIG. 2 is a diagram illustrating an exemplary configuration of a liquid membrane cartridge used in the liquid membrane forming device according to the first embodiment.
Figure 3:
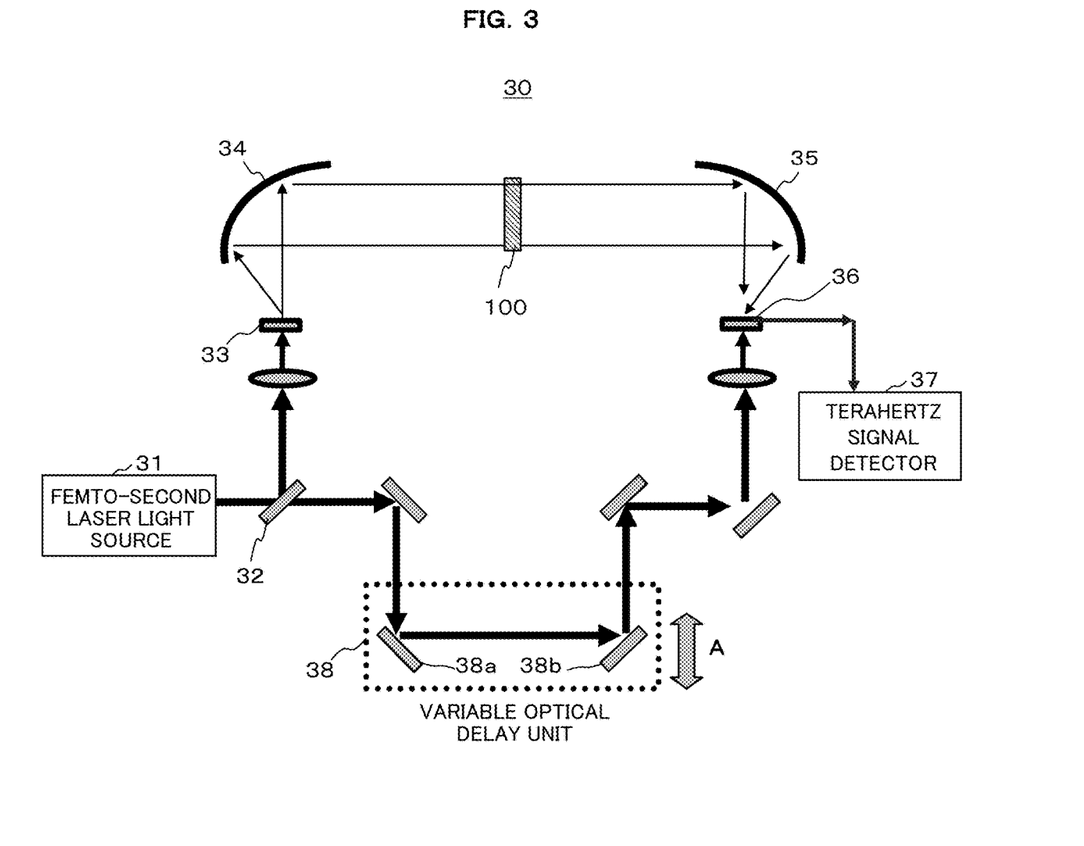
FIG. 3 is a diagram illustrating an exemplary configuration of a terahertz time-domain spectrometer as an example of a spectroscopic device obtained by applying the liquid membrane forming device according to an embodiment of the invention.

A first embodiment of the invention will now be described with reference to the accompanying drawings. FIG. 1 is a diagram illustrating an exemplary configuration of a liquid membrane forming device according to a first embodiment. FIG. 2 is a diagram illustrating an exemplary configuration of a liquid membrane cartridge used in the liquid membrane forming device according to the first embodiment. FIG. 2(a) is a front view, and FIG. 2(b) is a side view. FIG. 3 is a diagram illustrating an exemplary configuration of a terahertz time-domain spectrometer as an example of a spectroscopic device obtained by applying the liquid membrane forming device according to the first embodiment.

First, a configuration of the terahertz time-domain spectrometer will be described with reference to FIG. 3. In the terahertz time-domain spectrometer according to this embodiment, a liquid sample is arranged in the middle of a terahertz wave propagation passage, and characteristics of terahertz waves transmitting through the liquid sample are measured in time domain. Specifically, a time-domain waveform of the terahertz wave transmitting through the liquid sample is detected, and this detection signal is subjected to Fourier transform to obtain amplitude information and phase information for each frequency of the terahertz wave. Alight source uses a femto-second laser pulse which is excitation light.

As illustrated in FIG. 3, a terahertz time-domain spectrometer 30 according this embodiment includes a femto-second laser light source 31, a laser diverging unit 32, a terahertz wave generation semiconductor 33, first and second paraboloid mirrors 34 and 35, a terahertz wave detection semiconductor 36, a terahertz signal detector 37, and a variable optical delay unit 38.

The laser diverging unit 32 divides the laser light emitted from the femto-second laser light source 31 (femto-second laser pulse) into pump light for operating the terahertz wave generation semiconductor 33 as a terahertz light source and sampling light for increasing an infinitesimal current generated from the terahertz waves incident to the terahertz wave detection semiconductor 36 as a terahertz wave detection unit. Specifically, the laser diverging unit 32 has a semitransparent mirror. The terahertz wave generation semiconductor 33 generates terahertz waves on the basis of the pump light spectrally decomposed by the laser diverging unit 32.

The first parabolic mirror 34 reflects the terahertz waves generated from the terahertz wave generation semiconductor 33 and outputs parallel light beams without aberration. The terahertz wave reflected on the first parabolic mirror 34 transmits through the sample liquid membrane 100 and reaches the second parabolic mirror 35. The second parabolic mirror 35 reflects the light beams transmitting through the sample liquid membrane 100 and incident in parallel and focuses the reflected light beams on the terahertz wave detection semiconductor 36.

The terahertz wave detection semiconductor 36 detects a terahertz wave converged by the second parabolic mirror 35 and outputs a terahertz wave signal representing a waveform of the terahertz wave. The terahertz signal detector 37 detects this terahertz wave signal and performs Fourier transform for the detection signal to obtain amplitude information and phase information for each frequency of the terahertz wave.

The variable optical delay unit 38 is provided in the middle of a propagation path of the sampling light spectrally decomposed by the laser diverging unit 32 to variably set a delay amount of the sampling light. The variable optical delay unit 38 has a pair of reflection mirrors 38a and 38b physically configured to move in parallel as indicated by the arrow A. As a result, the delay time of the sampling light is set to be variable. The variable optical delay unit 38 is used to measure a temporal change of the terahertz wave while delaying a timing at which the sampling light reaches the terahertz wave detection semiconductor 36.

Next, an overview of the liquid membrane forming device 10 for forming the sample liquid membrane 100 will be described with reference to FIG. 1. Note that FIG. 1 illustrates the inside of the liquid membrane forming device 10. The liquid membrane forming device 10 according to the first embodiment includes a container 11, a tube pump 12 (as an example of the pump described in the claims), an outgoing pipe 13, a returning pipe 14, and a liquid membrane cartridge 20. The container 11 has a recovery reservoir 11a for the liquid. Although it will be described below in more details with reference to FIG. 2, the liquid membrane cartridge 20 has a nozzle for forming a sample liquid membrane 100 by jetting a liquid and a slope wall where the sample liquid membrane 100 formed by the nozzle makes contact with.

The tube pump 12 sucks the measurement target liquid from the recovery reservoir 11a through the returning pipe 14, pressurizes the sucked liquid, and delivers the liquid to the liquid membrane cartridge 20 through the outgoing pipe 13.

The liquid membrane cartridge 20 forms a plate-shaped sample liquid membrane 100 having a flat surface in space by jetting, from the nozzle, the liquid delivered by the tube pump 12 from the recovery reservoir 11a. In addition, the sample liquid membrane 100 formed by the nozzle is brought into contact with the slope wall in the space to convert the liquid membrane into droplets. The liquid membrane cartridge 20 is detachably installed in the container 11.

The recovery reservoir 11a recovers and stores the liquid gently running down from the slope wall of the liquid membrane cartridge 20. The liquid stored in the recovery reservoir 11a is again sucked by the tube pump 12, is pressurized, and is then jetted from the nozzle of the liquid membrane cartridge 20. In this manner, in the liquid membrane forming device 10 according to the first embodiment, the liquid inside the recovery reservoir 11a is circulated, and the sample liquid membrane 100 is formed by the nozzle in the course of the circulation.

Next, a configuration of the liquid membrane cartridge 20 according to the first embodiment will be described with reference to FIG. 2. As illustrated in FIG. 2, the liquid membrane cartridge 20 according to the first embodiment includes a nozzle portion 210 and a nozzle cover 220 installed in the nozzle portion 210 for use. The nozzle cover 220 serves as a casing of the liquid membrane cartridge 20.

The nozzle cover 220 has a window 23 where the terahertz waves transmitting to the sample liquid membrane 100 formed by the nozzle 21 of the nozzle portion 210 pass, a slope wall 24 provided in the downstream side from the window 23, a flow path 25 extending from the slope wall 24, and an anti-dispersion wall 26 provided in the upstream side from the window 23. Note that the shape of the window 23 illustrated in FIG. 2 is exemplary, and the invention is not limited to such a shape.

Using the nozzle 21, the liquid pressurized and supplied from the tube pump 12 is jetted to form the plate-shaped sample liquid membrane 100 having a flat surface in space as described above. For example, a nozzle described in Patent Document 2 may be employed as this nozzle 21. Note that the nozzle 21 is inserted and fixed to the nozzle support body 22 which is a casing that supports the nozzle 21. In addition, the nozzle support body 22 is fixed to the nozzle cover 220.

Figure 4:
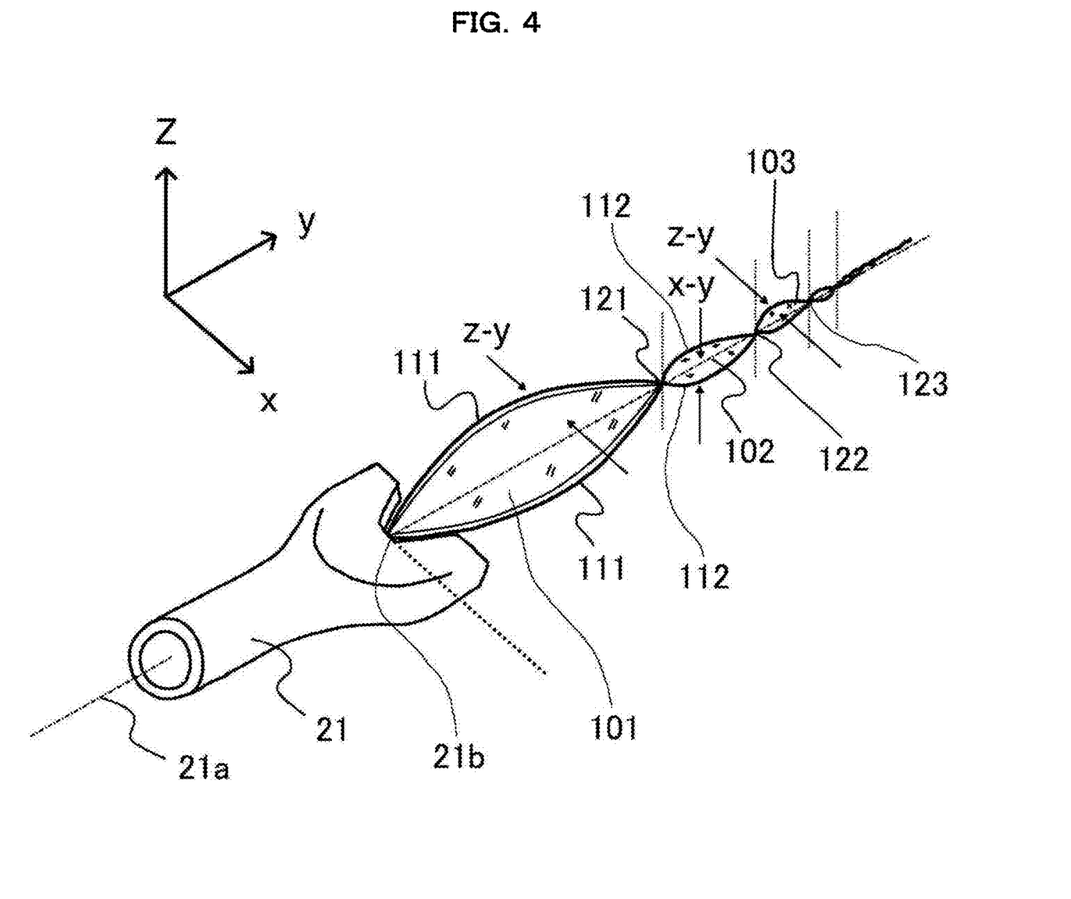
FIG. 4 is a diagram for describing spatial arrangement of a sample liquid membrane formed by a nozzle according to an embodiment of the invention.

FIG. 4 is a diagram for describing spatial arrangement of the liquid membrane formed by the nozzle 21. FIG. 4 illustrates an example of the liquid membrane formed without the slope wall 24. Here, a three-dimensional coordinate axes for defining space is indicated using an x-y-z coordinate system. It is assumed that a center axis 21a of the nozzle 21 is directed in the y-axis direction. A slit-shaped opening 21b perpendicular to the center axis 21a is provided in the tip of the nozzle 21, and it is assumed that this slit is in parallel with the x-axis.

As illustrated in FIG. 4, the liquid jetted from the opening 21b provided in the tip of the nozzle 21 sequentially forms a plurality of liquid membrane surfaces 101 to 103 perpendicular to each other. The first liquid membrane surface 101 is formed by virtue of surface tension of the liquid jetted from the opening 21b of the nozzle 21 and placed between a pair of string-shaped fluid columns 111 flowing on the z-y plane. That is, the pair of string-shaped fluid columns 111 join at a fluid column joining point 121 along smooth arcs to form the first liquid membrane surface 101 by virtue of surface tension of the liquid between the opening 21b of the nozzle 21 and the fluid column joining point 121. Therefore, the first liquid membrane surface 101 is perpendicular to the x-axis and is in parallel with the z-y plane.

The pair of string-shaped fluid columns 111 joining at the fluid column joining point 121 turn by 90° to form a pair of string-shaped fluid columns 112 flowing on the x-y plane, and the pair of fluid columns 112 join at the next fluid column joining point 122 along smooth arcs. As a result, a second liquid membrane surface 102 is formed by virtue of surface tension of the liquid between the first fluid column joining point 121 and the second fluid column joining point 122. Therefore, the second liquid membrane surface 102 is perpendicular to the first liquid membrane surface 101, perpendicular to the x-axis, and in parallel with the x-y plane.

Similar to the first or second liquid membrane surface 101 or 102, the third liquid membrane surface 103 is formed by virtue of surface tension of the liquid between the second fluid column joining point 122 and the third fluid column joining point 123. The third liquid membrane surface 103 is perpendicular to the second liquid membrane surface 102, perpendicular to the x-axis, and in parallel with the z-y plane.

The slope wall 24 illustrated in FIG. 2 makes contact with the planar sample liquid membrane 100 formed by the nozzle 21 along the surface of the sample liquid membrane 100. If the pressurized sample liquid membrane 100 is directly recovered in the recovery reservoir 11a, the liquid entering the recovery reservoir 11a rebounds on the surface of the stored liquid, and air bubbles are mixed due to agitation of the liquid of the recovery reservoir 11a. In order to prevent mixing of the air bubbles, the sample liquid membrane 100 makes contact with the slope wall 24 for deceleration, and the liquid gently runs down from the flow path 25 along the slope wall 24 and is recovered in the recovery reservoir 11a.

Note that the liquid membrane cartridge 20 may be arranged such that at least an end portion of the flow path 25 (an end of the liquid membrane cartridge 20) makes contact with the liquid stored in the recovery reservoir 11a. As a result, it is possible to prevent the liquid running down from the flow path 25 from rebounding on the liquid surface when it is recovered in the recovery reservoir 11a.

Figure 5:
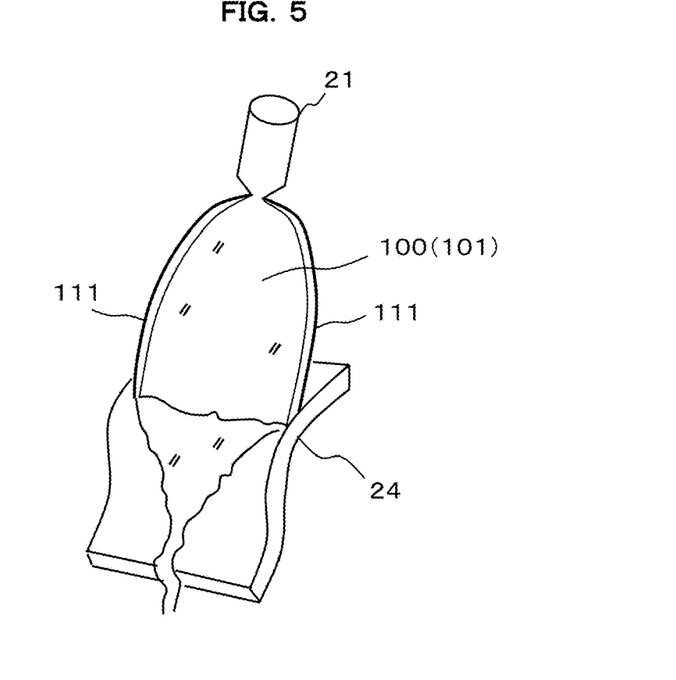
FIG. 5 is a diagram illustrating a state in which the sample liquid membrane makes contact with a slope wall according to an embodiment of the invention.

FIG. 5 is a diagram illustrating a state in which the sample liquid membrane 100 makes contact with the slope wall 24. As illustrated in FIG. 5, according to this embodiment, the first liquid membrane surface 101 formed by virtue of surface tension of the liquid between the pair of fluid columns 111 formed by the liquid jetted from the opening 21b of the nozzle 21 makes contact with the slope wall 24. As a result, while the upstream side of the first liquid membrane surface 101 forms a plate-shaped liquid membrane having a flat surface, the downstream side makes contact with the slope wall 24 and forms droplets. This flat portion of the upstream side is placed in a portion of the window 23 where the terahertz waves pass.

By the way, if the pressurized sample liquid membrane 100 is dispersed as it makes contact with the slope wall 24, the dispersed liquid may be attached on the window 23 or may be escaped from the window 23 to the outside and attached on any neighboring optical element. Therefore, in order to prevent dispersion of the liquid, preferably, the sample liquid membrane 100 smoothly makes contact with the slope wall 24. For this reason, the wall surface of the slope wall 24 is angled such that impact generated as the sample liquid membrane 100 makes contact can be absorbed. In this embodiment, the wall surface of the slope wall 24 is formed as a smooth curved surface. Specifically, the wall surface of the slope wall 24 has a cycloid curve profile or a curve profile similar thereto.

The anti-dispersion wall 26 is a wall for preventing dispersion of the liquid caused by bumping in the opening 21b of the nozzle 21 and is placed near the opening 21b.

As described above in details, according to the first embodiment, the sample liquid membrane 100 is formed by jetting, from the nozzle 21, the liquid sucked from the recovery reservoir 11a and pressurized by the tube pump 12. The formed sample liquid membrane 100 makes contact with the slope wall 24 along the surface of the sample liquid membrane 100, and the liquid running down from the slope wall 24 is recovered and stored in the recovery reservoir 11a.

According to the first embodiment configured as described above, the sample liquid membrane 100 formed by strongly jetting the pressurized liquid from the nozzle 21 makes contact with the slope wall 24 to form droplets and is decelerated. In addition, the liquid running down along the slope wall 24 in the decelerated state is recovered in the recovery reservoir 11a. For this reason, it is possible to prevent the liquid entering the recovery reservoir 11a from generating air bubbles caused by agitation of the liquid stored in the recovery reservoir 11a. As a result, it is possible to prevent air bubbles from being generated by the jetted liquid when the liquid of the recovery reservoir 11a is sucked using the tube pump 12, is pressurized again, and is jetted from the nozzle 21. Therefore, it is possible to prevent dispersion caused by the air bubbles in the tip of the nozzle 21.

According to the first embodiment, the sample liquid membrane 100 generated by jetting the liquid from the nozzle 21 makes contact with the slope wall 24 in space after the jetting and is decelerated. Therefore, it is not necessary to provide an uneven structure in the middle of the flow path of the liquid before the liquid is jetted from the nozzle 21 (before forming the liquid membrane). In addition, according to the first embodiment, the flow velocity of the liquid does not decrease by lowering the pressure of the tube pump 12. Instead, the flow velocity decreases by the contact between the jetted liquid and the slope wall 24 while the liquid is strongly jetted from the nozzle 21 by applying a pressure necessary to form a thin and flat sample liquid membrane 100. Therefore, it is possible to form the sample liquid membrane 100 where terahertz waves can appropriately transmit.

That is, the flow velocity of the sample liquid membrane 100 generated by the nozzle 21 can be decelerated by lowering the pressure of the tube pump 12. However, if the pressure of the tube pump 12 is lowered, it is difficult to form the liquid membrane used in measurement of terahertz waves. That is, since the nozzle 21 necessitating a high pressure exists in the middle of the circulation, reducing the pressure of the entire circulation loop using a pump having a low pressurizing force is not acceptable. In comparison, according to the first embodiment, it is possible to provide a liquid circulation system such that the liquid is pressurized to a high pressure in a part of the circulation loop while being decelerated to a low pressure enough not to generate air bubbles in the liquid of the recovery reservoir 11a in another part of the circulation loop.

As a result, according to the first embodiment, it is possible to form the sample liquid membrane 100 thin and flat enough to appropriately transmit terahertz waves and prevent dispersion of the liquid caused by air bubbles from being generated in the tip of the nozzle 21. Alternatively, although the liquid membrane forming device is applied to the terahertz time-domain spectrometer 30 by way of example in the first embodiment, the liquid membrane forming device may also be applied to a spectroscopic device based on other electromagnetic waves such as infrared rays. In this case, it is possible to form a sample liquid membrane thin and flat enough to appropriately transmit such electromagnetic waves and prevent dispersion of the liquid caused by air bubbles from being generated in the tip of the nozzle 21.

According to the first embodiment, the wall surface of the slope wall 24 is formed in a cycloid curve shape or a curve shape similar thereto. Therefore, it is possible to rapidly decelerate the liquid flow by bring the liquid into contact with the sample liquid membrane 100 without dispersing the liquid by contact impact. For this reason, it is not necessary to wait for deceleration of the velocity of the sample liquid membrane 100 jetted from the nozzle 21 across a long flow path. Therefore, it is possible to provide a compact liquid membrane cartridge 20. That is, a distance between the nozzle 21 and the slope wall 24 may be shorter than the length of the first liquid membrane surface 101, and it is not necessary to lengthen the flow path 25 extending in front of the slope wall 24. Therefore, a spatial distance from the nozzle 21 to the leading end of the flow path 25 is reduced. Accordingly, it is possible to provide a compact liquid membrane cartridge 20.

According to the first embodiment, advantageously, it is also possible to prevent stripe waves from being generated on the liquid membrane surface of the sample liquid membrane 100. By preventing the stripe waves, it is possible to prevent noise caused by such waves from being mixed with a measurement signal. This advantage is effective especially in a spectroscopic device based on terahertz waves.

Figure 6:
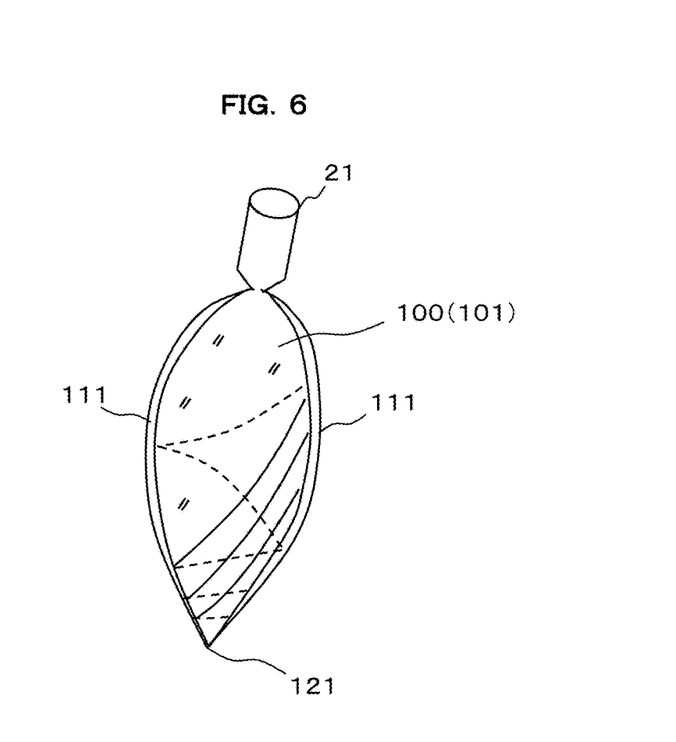
FIG. 6 is a diagram for describing stripe waves generated in the sample liquid membrane.

Although the nozzle 21 forms a flat liquid membrane in the aforementioned description made in conjunction with FIG. 4, it is difficult to form a perfectly flat liquid membrane in practice. In practice, stripe waves are generated on the liquid membrane surface as illustrated in FIG. 6. That is, as described above, the sample liquid membrane 100 is formed by virtue of surface tension between the pair of fluid columns 111. In this case, stripe waves are generated on the surface of the liquid membrane starting from nearly an upper half part of the liquid membrane (near a ⅓ portion of the length from the opening 21b of the nozzle 21 to the fluid column joining point 121 where the pair of fluid columns 111 join with each other). Such waves are generated from the pair of fluid columns 111, and the number of the waves increases toward the lower part of the liquid membrane. Since a width between the stripe waves is nearly equal to the wavelength of the terahertz waves, any stripe wave placed in the vicinity of a portion where terahertz waves pass makes an interference effect, and noise caused by the interference effect is mixed with the measurement signal.

In comparison, according to the first embodiment, the sample liquid membrane 100 (first liquid membrane surface 101) makes contact with the slope wall 24 as illustrated in FIG. 5. Therefore, a flat plate-shaped liquid membrane is formed only in the upstream side of the sample liquid membrane 100, and the downstream side makes contact with the slope wall 24 to form droplets. For this reason, it is possible to reduce the stripe waves generated on the liquid membrane while decelerating the pressurized liquid using the slope wall 24. As a result, it is possible to reduce noise mixed with the measurement signal of the terahertz waves.

In order to improve an effect of reducing the stripe waves, preferably, the slope wall 24 is placed to make contact with the sample liquid membrane 100 in an approximately ⅓ position of the length of the first liquid membrane surface 101 (that is, the length from the opening 21b of the nozzle 21 to the fluid column joining point 121 where the pair of fluid columns 111 join with each other). Alternatively, since the stripe waves increase toward the lower part of the liquid membrane as described above, the slope wall 24 may be placed in the downstream side from the aforementioned approximately ⅓ position.

Note that, although a cartridge configuration having the slope wall 24 provided in the nozzle cover 220 and the nozzle portion 210 installed in the nozzle cover 220 has been described in the first embodiment, the invention is not limited thereto. Alternatively, the slope wall 24 may be provided as a part of the container 11. By providing the slope wall 24 as a part of the liquid membrane cartridge 20, it is possible to provide a disposable configuration and perform measurement without impurities advantageously.

Second Embodiment

Figure 7:
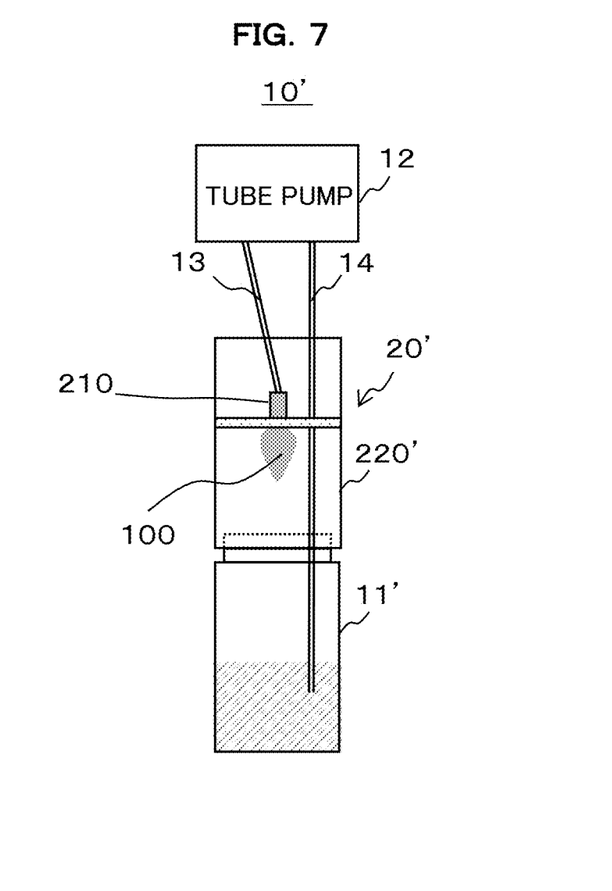
FIG. 7 is a diagram illustrating an exemplary configuration of a liquid membrane forming device according to a second embodiment.
Figure 8:
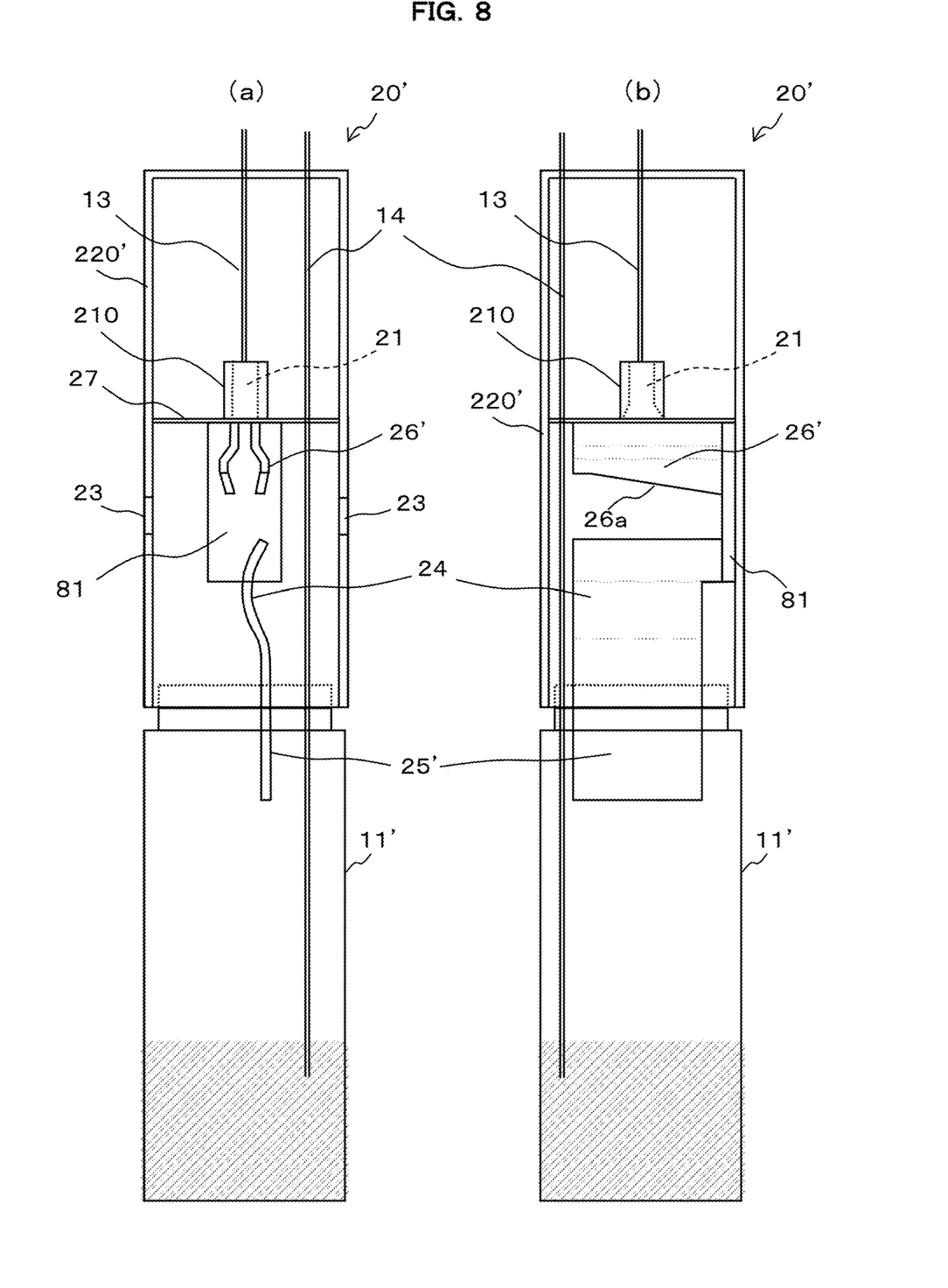
FIG. 8 is a diagram illustrating an exemplary configuration of a liquid membrane cartridge used in the liquid membrane forming device according to the second embodiment.

Next, a second embodiment of the invention will be described with reference to the accompanying drawings. FIG. 7 is a diagram illustrating an exemplary configuration of a liquid membrane forming device 10' according to the second embodiment. FIG. 8 is a diagram illustrating an exemplary configuration of a liquid membrane cartridge 20' used in the liquid membrane forming device 10' according to the second embodiment. FIG. 8(a) is a front view, and FIG. 8(b) is a side view. Note that FIGS. 7 and 8 illustrate the inside of the liquid membrane cartridge 20' for convenient description purposes. In FIGS. 7 and 8, like reference numerals denote like elements as in FIGS. 1 and 2.

As illustrated in FIG. 7, the liquid membrane forming device 10' according to the second embodiment includes a liquid recovery reservoir 11', a tube pump 12, an outgoing pipe 13, a returning pipe 14, and a liquid membrane cartridge 20'. The liquid membrane cartridge 20' has a nozzle portion 210 or a slope wall 24 (not shown in FIG. 7) provided inside a cylindrical casing. The recovery reservoir 11' has, for example, a circular cylindrical shape while its leading end opening is detachably installed in the bottom of the liquid membrane cartridge 20' (nozzle cover 220' serving as a casing of the liquid membrane cartridge 20').

Figure 9:
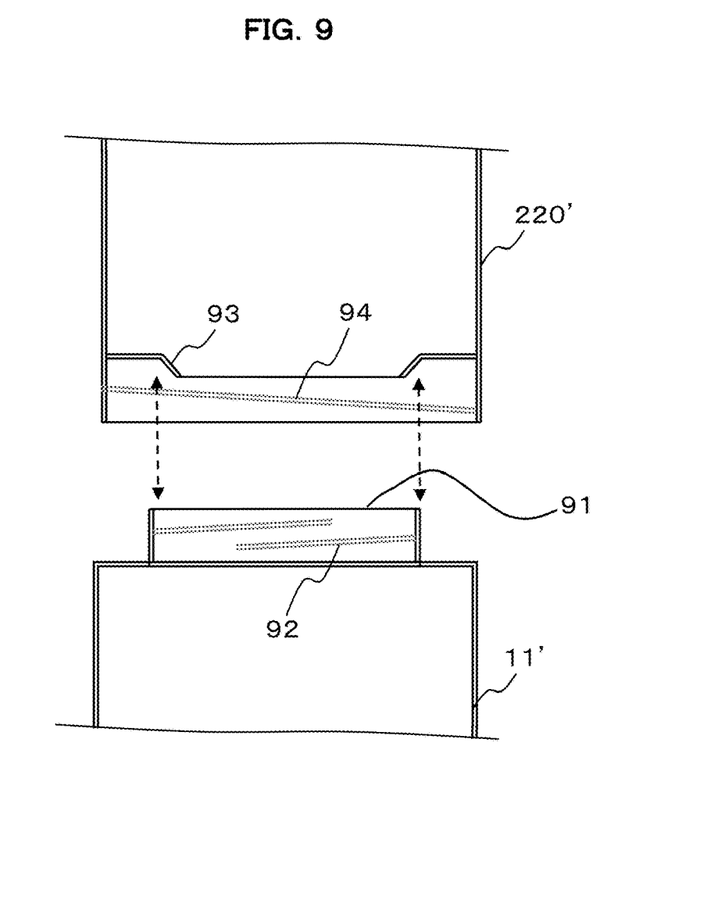
FIG. 9 is a diagram illustrating an exemplary installation/uninstallation structure between the liquid membrane cartridge and the recovery reservoir according to the second embodiment.

For example, a ring portion 93 to which a cylindrical opening 91 of the leading end of the recovery reservoir 11' is fitted is provided on the bottom of the nozzle cover 220', and a thread portion 94 is provided under the ring portion 93 as illustrated in FIG. 9. Meanwhile, a thread portion 92 is also provided on the outer circumference of the opening 91 of the recovery reservoir 11'. As a result, the thread portions 92 and 94 mesh with each other by fitting the opening 91 of the recovery reservoir 11' to the ring portion 93 of the nozzle cover 220' and rotating the recovery reservoir 11' to one direction, so that the recovery reservoir 11' can be fixed to the bottom of the nozzle cover 220'. In addition, the recovery reservoir 11' can be removed from the nozzle cover 220' by reversely rotating the recovery reservoir 11'. Note that the structure for detachably installing the recovery reservoir 11' in the nozzle cover 220' is not limited to the example of FIG. 9.

The tube pump 12 sucks the measurement target liquid from the recovery reservoir 11' through the returning pipe 14, pressurizes the sucked liquid, and delivers the liquid to the nozzle 21 of the liquid membrane cartridge 20' through the outgoing pipe 13 (refer to FIGS. 8 and 4). The nozzle 21 forms a plate-shaped sample liquid membrane 100 having a flat surface in space by jetting the delivered liquid from the recovery reservoir 11' using the tube pump 12. In addition, the sample liquid membrane 100 formed by the nozzle 21 is brought into contact with the slope wall 24 (refer to FIG. 8) in the space to convert the liquid membrane into droplets.

The recovery reservoir 11' recovers and stores the liquid gently running down from the slope wall 24 of the liquid membrane cartridge 20 through the flow path 25'. The liquid stored in the recovery reservoir 11' is sucked by the tube pump 12 through the returning pipe 14 and is pressurized again. Then, the liquid is jetted from the nozzle 21 of the liquid membrane cartridge 20' through the outgoing pipe 13. In this manner, in the liquid membrane forming device 10' according to the second embodiment, the liquid inside the recovery reservoir 11' is circulated, and the sample liquid membrane 100 is formed by the nozzle 21 in the course of the circulation.

According to the second embodiment, the outgoing pipe 13 is coupled to the nozzle 21 through the inside of the liquid membrane cartridge 20'. In addition, the returning pipe 14 passing through the inside of the liquid membrane cartridge 20' is extracted from the bottom of the liquid membrane cartridge 20' and is inserted into the recovery reservoir 11'.

Next, a configuration of the liquid membrane cartridge 20' according to the second embodiment will be described with reference to FIG. 8. As illustrated in FIG. 8, the liquid membrane cartridge 20' according to the second embodiment includes a nozzle portion 210, a slope wall 24, a flow path 25' extending from the slope wall 24, and an anti-dispersion wall 26' housed in the nozzle cover 220'. The nozzle cover 220' has a window 23 where terahertz waves transmitting through the sample liquid membrane 100 formed by the nozzle 21 inside the nozzle portion 210 pass. The slope wall 24 is provided in the downstream side from the window 23, and the anti-dispersion wall 26' is provided in the upstream side from the window 23.

As illustrated in FIG. 8, the nozzle portion 210 is fixed to the fixation plate 27 opened at least in the center. The slope wall 24 and the anti-dispersion wall 26' are erected on the support plate 81 fixed to the fixation plate 27. The support plate 81 is placed in a position not facing the window 23 where terahertz waves pass, specifically, in the vicinity of the wall surface of the nozzle cover 220'. As illustrated in FIG. 8(*b*), according to the second embodiment, the anti-dispersion wall 26' has an opening 26*a* placed in an exit side of the liquid jetted from the nozzle 21 and sloped from the upside to the downside (from the nozzle 21 side to the slope wall 24 side). The support plate 81 is placed in the lowermost side of the inclination.

As a result, a droplet adhered to the anti-dispersion wall 26' due to liquid bumping in the opening 21*b* of the nozzle 21 flows along the slope of the opening 26*a* by virtue of its self weight and reaches the support plate 81. Then, the droplet further flows downward from the support plate 81. For this reason, it is possible to prevent a droplet adhered to the anti-dispersion wall 26' from falling down to the window 23 and being adhered to a terahertz wave optical element placed outside the window 23.

As described above, according to the second embodiment, the container 11 of the first embodiment is removed, and the recovery reservoir 11' is installed in the liquid membrane cartridge 20' (nozzle cover 220'). Therefore, it is possible to provide a compact configuration as a whole. In addition, both the recovery reservoir 11' and the liquid membrane cartridge 20' have disposable configurations, so that it is possible to perform measurement without an impurity.

According to the second embodiment, the opening 26*a* of the exit side of the anti-dispersion wall 26' is sloped from the upside to the downside. Therefore, a droplet adhered to the anti-dispersion wall 26' can flow to the support plate 81 along the slope. As a result, it is possible to prevent a droplet adhered to the anti-dispersion wall 26' from falling down to the window 23 and being adhered to a terahertz wave optical element placed outside the window 23.

Hereinbefore, the first and second embodiments have been described, in which the sample liquid membrane 100 formed by jetting the pressurized liquid from the nozzle 21 makes contact with the slope wall 24 along the surface of the sample liquid membrane 100. A devisal for appropriately bringing the sample liquid membrane 100 into contact with the slope wall 24 will now be described. First, a first devisal will be described with reference to FIG. 10.

Figure 10:
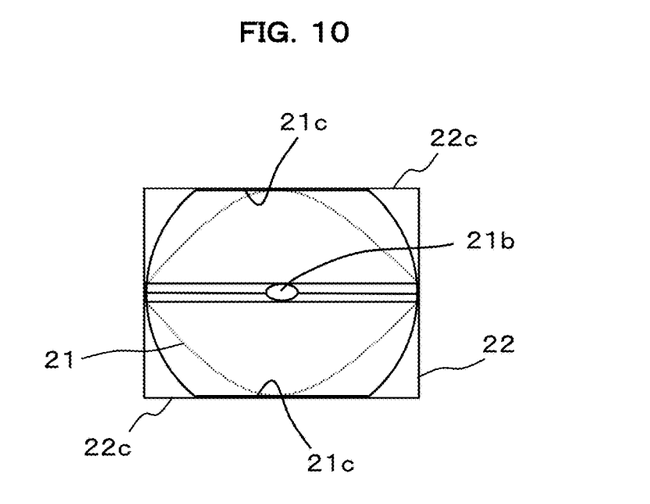
FIG. 10 is a diagram illustrating exemplary configurations of a nozzle and a nozzle support body according to an embodiment of the invention.

FIG. 10 is a diagram illustrating exemplary configurations of the nozzle 21 and the nozzle support body 22. FIG. 10 illustrates a state as seen from the tip side of the nozzle 21. As illustrated in FIG. 10, flat surfaces 21*c* and 21*c* are formed oppositely on the circumferential surface of the cylindrical pipe of the nozzle 21. Meanwhile, flat surfaces 22*c* and 22*c* facing the flat surfaces 21*c* and 21*c* are also provided in the nozzle support body 22 into which the nozzle 21 is inserted.

If the cylindrical pipe of the nozzle 21 and the nozzle support body 22 have circular cross-sectional shapes, an angle of the nozzle 21 inserted into the nozzle support body 22 and specifically, a direction of the opening 21*b* are not determined to a constant value. In comparison, in the configuration of FIG. 10, it is possible to set the angle of the nozzle 21 fixed to the nozzle support body 22 to a constant value at all times. As a result, it is possible to bring the sample liquid membrane 100 formed by the nozzle 21 into parallel contact with the slope wall 24 at all times.

Note that a positioning structure for setting the fixation angle of the nozzle 21 to a constant value at all times in the nozzle support body 22 is not limited to the flat surfaces 21*c* and 22*c* described above. For example, a convex portion may be provided in one of the nozzle 21 and the nozzle support body 22, and a concave portion may be provided in the other one, so that the convex and the concave portions may be fitted to each other.

However, the configuration of the nozzle 21 is preferably symmetric. If the configuration of the nozzle 21 is asymmetric, the liquid is jetted from the opening 21*b* of the nozzle 21 in a sloped state, so that the resulting sample liquid membrane 100 may make contact with the slope wall 24 in a sloped state.

Figure 11:
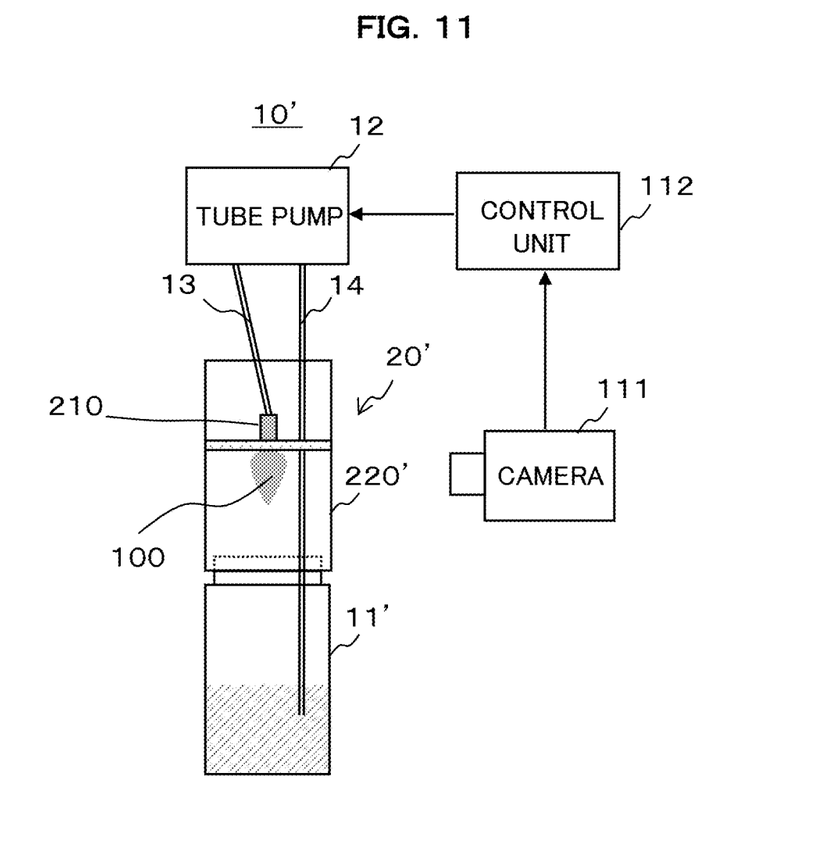
FIG. 11 is a diagram illustrating a modification of the liquid membrane forming device according to the second embodiment.

Next, a second devisal will be described with reference to FIG. 11. FIG. 11 is a diagram illustrating a liquid membrane forming device 10' according to a modification of the second embodiment. Note that, although a modification of the liquid membrane forming device 10' of the second embodiment will be described here, the same configuration may also be employed in a modification of the liquid membrane forming device 10 of the first embodiment.

In the example of FIG. 11, the nozzle cover 220' is formed of a transparent material (for example, transparent resin). A camera 111 is provided outside the nozzle cover 220'. The camera 111 photographs the sample liquid membrane 100 jetted from the nozzle 21 placed inside the nozzle cover 220'. The image data photographed by the camera 111 is transmitted to the control unit 112.

The control unit 112 analyzes the image data and determines a state of the sample liquid membrane 100. In addition, the control unit 112 appropriately controls the tube pump 12 depending on the determination result. For example, when the sample liquid membrane 100 collides with the slope wall 24, the control unit 112 measures a width of the sample liquid membrane 100 for a portion colliding with the slope wall 24 through image processing. If the width of the sample liquid membrane 100 is narrower than a prescribed value, a rotation number of the tube pump 12 increases. Conversely, if the width of the sample liquid membrane 100 is wider than the prescribed value, the rotation number of the tube pump 12 decreases.

The control unit 112 increases the rotation number of the tube pump 12 if it is detected that the sample liquid membrane 100 is too short and does not reach the slope wall 24 as a result of the image processing. Conversely, if it is detected that the sample liquid membrane 100 is excessively widened and is eliminated before colliding with the slope wall 24 as a result of the image processing, the control unit 112 decreases the rotation number of the tube pump 12.

In this manner, if the nozzle cover 220' is formed of transparent resin, it is possible to photograph a condition of the sample liquid membrane 100 from the outside of the nozzle cover 220'. In addition, by analyzing the photographed image using the control unit 112, it is possible to determine whether or not the sample liquid membrane 100 appropriately collides with the slope wall 24 and control the driving of the tube pump 12 to suitably collide with the slope wall 24. As a result, it is possible to appropriately form the sample liquid membrane 100.

Note that, although the first and second embodiments have been described by assuming that the wall surface of the slope wall 24 has a cycloid curve profile or a surface profile similar thereto, the invention is not limited thereto. That is, any other surface other than the cycloid curve profile may also be employed as long as the surface of the sample liquid membrane 100 can smoothly make contact.

Note that both the first and second embodiments described above are merely examples of implementation of the invention, and it would be appreciated that the technical scope of the invention is not construed as being limited thereby. That is, the invention may be modified in various forms without departing from the gist or main features thereof.

REFERENCE SIGNS LIST 10, 10' Liquid membrane forming device
11a, 11' Recovery reservoir
12 Tube pump
20, 20' Liquid membrane cartridge
21 Nozzle
22, 22' Nozzle support body
23 Window
24 Slope wall
26, 26' Anti-dispersion wall
210 Nozzle portion
220, 220' Nozzle cover

The invention claimed is:

1. A liquid membrane forming device used in a spectroscopic measurement system for measuring characteristics of terahertz electromagnetic waves transmitting through a liquid sample placed in the middle of a terahertz wave propagation path, and used for forming a liquid membrane as the liquid sample, the liquid membrane forming device comprising:
a nozzle configured to form an initial plate-shaped liquid membrane having a flat surface that intersects the terahertz wave propagation path in space by jetting a liquid;
a slope wall making contact, in parallel along a surface of the initial plate-shaped liquid membrane, with the initial plate-shaped liquid membrane formed by the nozzle;
a recovery reservoir configured to recover and store a liquid running down from the slope wall; and
a pump configured to suck the liquid stored in the recovery reservoir, pressurize the liquid, and jet the liquid from the nozzle;
wherein a wall surface of the slope wall has a cycloid curve profile, and the contact occurs on a convex outer facing side of the slope wall;
further comprising a nozzle cover in which the nozzle is installed,
wherein the nozzle cover has:
a window for passing terahertz waves transmitting through the liquid membrane formed by the nozzle, and the slope wall provided in the downstream side from the window.

2. The liquid membrane forming device according to claim 1, wherein the slope wall is placed in an approximately ⅓ position of a length from the nozzle opening to a fluid column joining point where a pair of fluid columns join with each other or in a downstream side from the ⅓ position in the liquid membrane formed by surface tension of the liquid between a pair of the fluid columns formed by the liquid jetted from the nozzle opening.

3. The liquid membrane forming device according to claim 1, wherein the recovery reservoir has an opening in its leading end configured to detachably installed in a bottom of the nozzle cover.

4. The liquid membrane forming device according to claim 1, further comprising an anti-dispersion wall provided around the nozzle opening to prevent dispersion of the liquid caused by bumping in the nozzle opening.

5. The liquid membrane forming device according to claim 4, wherein the anti-dispersion wall has an opening in an exit side of the liquid jetted from the nozzle, and the opening is sloped from the nozzle side to the slope wall side.

6. The liquid membrane forming device according to claim 1, further comprising a nozzle support body for fixing the nozzle to be inserted thereto,
wherein the nozzle and the nozzle support body have a positioning structure for setting a fixation angle of the nozzle inside the nozzle support body to a constant value at all times.

7. The liquid membrane forming device according to claim 6, wherein the positioning structure includes flat surfaces provided oppositely on a cylindrical pipe of the nozzle and flat surfaces provided oppositely on the nozzle support body.

8. The liquid membrane forming device according to claim 1, wherein the nozzle cover is formed of a transparent material to allow the inside of the nozzle cover to be photographed from the outside.

9. The liquid membrane forming device according to claim 1, wherein the slope wall is placed in an approximately ⅓ position of a length from the nozzle opening to a fluid column joining point where a pair of fluid columns join with each other or in a downstream side from the ⅓ position in the liquid membrane formed by surface tension of the liquid between a pair of the fluid columns formed by the liquid jetted from the nozzle opening.

10. A liquid membrane cartridge used in a spectroscopic measurement system for measuring characteristics of terahertz waves transmitting through a liquid sample placed in the middle of a terahertz wave propagation path, and used for forming a liquid membrane as the liquid sample, the liquid membrane cartridge comprising:
a nozzle configured to form an initial plate-shaped liquid membrane having a flat surface in space by jetting a liquid; and
a slope wall making contact, in parallel along a surface of the initial plate-shaped liquid membrane, with the initial plate-shaped liquid membrane formed by the nozzle;
wherein a wall surface of the slope wall has a cycloid curve profile, and the contact occurs on a convex outer facing side of the slope wall;
further comprising a nozzle cover in which the nozzle is installed,
wherein the nozzle cover has:
a window for passing terahertz waves transmitting through the liquid membrane formed by the nozzle, and the slope wall provided in the downstream side from the window.

11. The liquid membrane cartridge according to claim 10, wherein the slope wall is placed in an approximately ⅓ position of a length from the nozzle opening to a fluid column joining point where a pair of fluid columns join with each other or in a downstream side from the ⅓ position in the liquid membrane formed by surface tension of the liquid between a pair of the fluid columns formed by the liquid jetted from the nozzle opening.

12. The liquid membrane cartridge according to claim 10, further comprising an anti-dispersion wall provided around the nozzle opening to prevent dispersion of the liquid caused by bumping in the nozzle opening.

13. The liquid membrane cartridge according to claim 12, wherein the anti-dispersion wall has an opening in an exit side of the liquid jetted from the nozzle, and the opening is sloped from the nozzle side to the slope wall side.

14. The liquid membrane cartridge according to claim 10, further comprising a nozzle support body for fixing the nozzle to be inserted thereto,
  wherein the nozzle and the nozzle support body have a positioning structure for setting a fixation angle of the nozzle inside the nozzle support body at all times.

15. The liquid membrane cartridge according to claim 14, wherein the positioning structure includes flat surfaces provided oppositely on a cylindrical pipe of the nozzle and flat surfaces provided provide oppositely on the nozzle support body.

16. The liquid membrane cartridge according to claim 10, wherein the nozzle cover is formed of a transparent material to allow the inside of the nozzle cover to be photographed from the outside.

* * * * *